250-201 AU 252 EX EXAMINER

FIP8212 XR 2,692,945

Oct. 26, 1954 J. O. BEAUMONT 2,692,945

CATHODE-RAY TUBE MODULATOR

Filed March 1, 1951 3 Sheets-Sheet 1

INVENTOR.
JAMES O. BEAUMONT

BY George H. Fisher

ATTORNEY

INVENTOR.
JAMES O. BEAUMONT
BY George H. Fisher
ATTORNEY

Oct. 26, 1954 J. O. BEAUMONT 2,692,945

CATHODE-RAY TUBE MODULATOR

Filed March 1, 1951 3 Sheets-Sheet 3

INVENTOR.
JAMES O. BEAUMONT

BY George H. Fisher

ATTORNEY

UNITED STATES PATENT OFFICE 2,692,945

CATHODE-RAY TUBE MODULATOR

James O. Beaumont, St. Paul, Minn., assignor to Minneapolis-Honeywell Regulator Company, Minneapolis, Minn., a corporation of Delaware Application March 1, 1951, Serial No. 213,386

17 Claims. (Cl. 250—27)

This invention relates to a modulator device in which a low level direct current signal voltage is converted to an alternating current voltage of sufficient level to supply power to a sizeable load.

Two considerations are present in a device of this type. First, the control signal must be amplified, that is, it must be converted from a low level signal to a high level signal. This makes it desirable to convert the direct current signal to alternating current so that the amplification can be easily accomplished. Second, the device must be null stable, that is, the alternating current voltage must be zero when the direct current signal voltage is zero.

It is therefore an object of the present invention to provide a new and improved modulator having the desirable characteristic of null stability while allowing amplification of the control signal.

It is a further object of the present invention to provide a modulator which is simple in construction and yet solves the problem of null stability.

It is an object of the present invention to provide a modulator making use of a cathode ray tube and having means to establish a magnetic field in an area of space traversed by the electron beam of the cathode ray tube so that the electron beam is deflected in one direction in one portion of the area and is deflected in the opposite direction in the other portion of the area.

It is an object of the present invention to provide a modulator making use of a cathode ray tube having an anode of resistive material with conductors bounding opposite edges thereof so that the current flow in a given conductor at any particular instant is dependent upon the resistance from the point of impingement of the electron beam to the given conductor at that particular instant.

It is a further object of the present invention to provide a cathode ray tube modulator wherein a fluorescent screen of the tube is partially covered by an opaque mask and a control circuit, including a photoelectric cell viewing the screen, is provided to cause the moving electron beam of the tube to remain positioned along the edge of the mask.

It is an object of the present invention to provide a modulator having a cathode ray tube with its fluorescent screen viewed by a photoelectric cell, the photoelectric cell controlling an amplifier which provides a voltage indicative of the force tending to shift the position of the electron beam, and means connecting this voltage to a set of deflection plates thereby causing the electron beam of the tube to remain in a predetermined position.

It is an object of the present invention to provide a modulator having a cathode ray tube with a split anode, the electron beam normally impinging equally upon the sections of the anode, and a differential amplifier responsive to unequal impingement to adjust the position of the electron beam by means of a pair of electrostatic deflection plates.

It is a further object of the present invention to provide a modulator which makes use of a cathode ray tube and which is free from errors normally produced by stray magnetic fields which may be present in the vicinity of the tube.

These and other objects of the present invention will be understood upon consideration of the accompanying specification, claims, and drawings of which:

Figure 4:
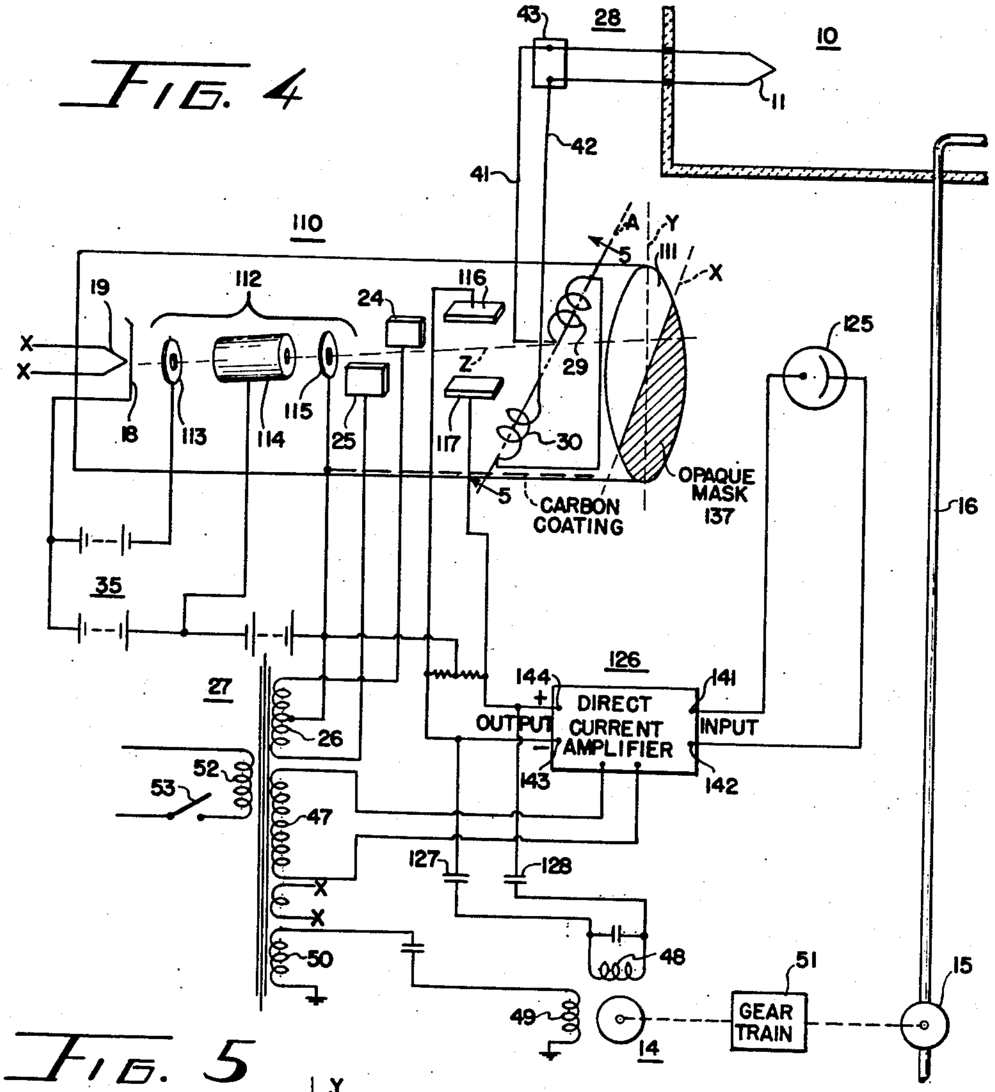
Figure 4 is a schematic representation of a modification of the improved modulator wherein the cathode ray tube fluorescent screen is provided with an opaque mask and a photo cell is provided to view the screen.
Figure 5:
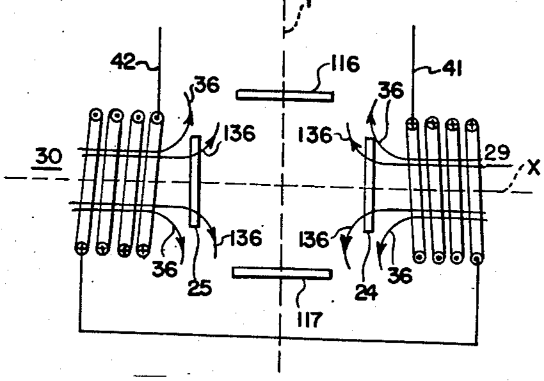
Figure 6:
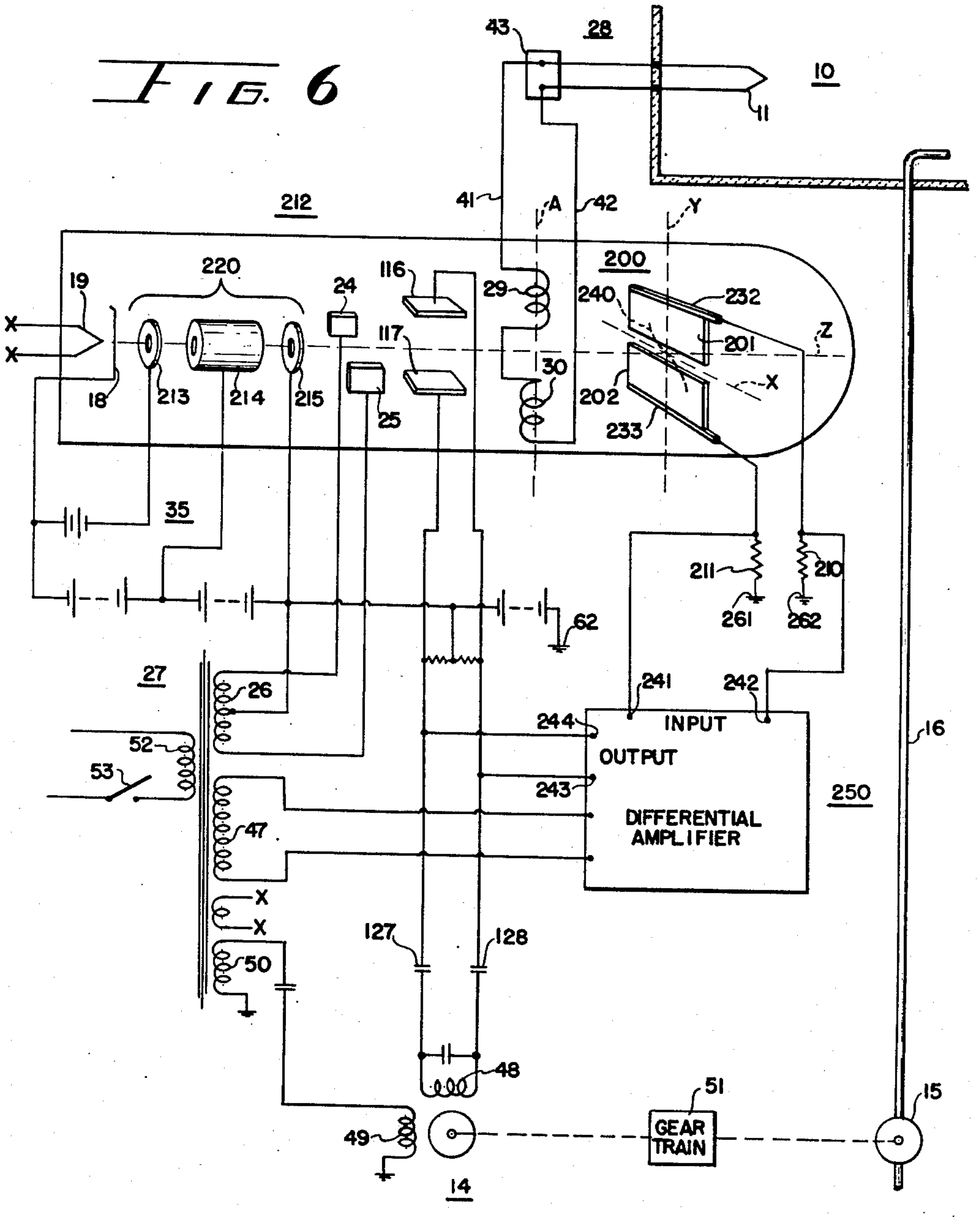

Figure 5 is a representation of the magnetic deflection coils of the cathode ray tube at the section 5—5 of Figure 4, showing the magnetic deflection coils in a second position; and Figure 6 is a schematic representation of a modification of the improved modulator wherein a split anode is incorporated in the cathode ray tube and, in conjunction with a differential amplifier, supplies a control signal when the electron beam is not impinging equally upon the sections of the split anode.

Figures 1, 2, 3:
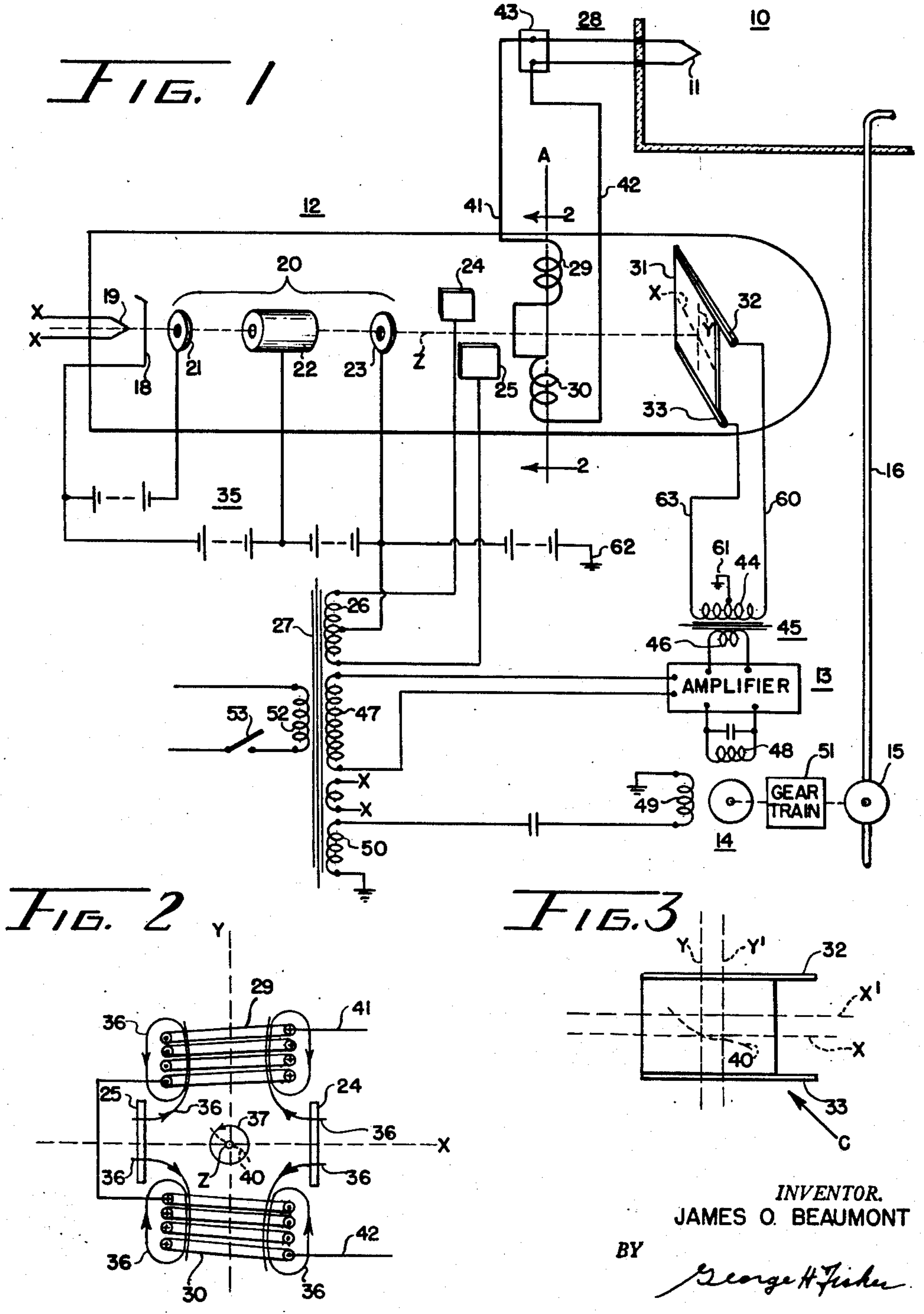
Figure 1 is a schematic representation of the improved modulator connected to control the temperature of a confined space.
Figure 2 is a representation of the magnetic deflection coils of the cathode ray tube at the section 2—2 of Figure 1, showing the coils in a first position.
Figure 3 is a diagram illustrating the effect of a stray magnetic field upon the electron beam of the cathode ray tube.

Figure 1 is a showing of the improved modulator wherein it is adapted to control the temperature of a confined space 10, shown in the upper right hand corner of Figure 1. The confined space 10 contains the hot junction 11 of a thermocouple 28 which senses the temperature of the space 10 and, by means of a cathode ray tube 12, a phase sensitive amplifier 13 and a two-phase reversible motor 14, causes a valve 15 in a fuel conduit 16 to be adjusted in accordance with the temperature of the space 10. The fuel conduit 16 supplies fuel to a burner, not shown, located in the confined space 10.

The cathode ray tube 12 of the modulator contains a cathode 18 which emits electrons when the cathode is heated by a filament 19. An electron gun 20 having a control grid 21, a focusing electrode 22 and an accelerating electrode 23 is provided in the cathode ray tube 12 to form the electrons being emitted from the cathode 18 into a narrow electron beam and to accelerate them along an axis labeled Z, shown by a dotted line.

Diametrically opposite from each other and centered about the axis Z are two electrostatic deflection plates 24 and 25. These plates are energized from a center tapped secondary 26 of a transformer 27. An alternating electrostatic field is thereby produced to modify the path of travel of the electron beam in a direction perpendicular to the surfaces of the plates 24 and 25.

In space quadrature position with respect to the plates 24 and 25 and centered about an axis A, which intersects the axis Z and is perpendicular thereto, are a pair of coils 29 and 30. The coils 29 and 30 are connected in a series circuit so that they produce opposing magnetic fields. This circuit can be traced as follows: coil 29, coil 30, conductor 42, thermocouple 28 and conductor 41 to coil 29. The cold junction 43 of the thermocouple 28 is maintained at a constant temperature by means not shown. This temperature is equal to the desired temperature of the confined space 10. Therefore, if the temperature of the confined space 10 drops below the desired value, the unidirectional voltage produced by the thermocouple 28 is of a first polarity while if the temperature rises above the desired value the polarity of this voltage is reversed. The magnitude and polarity of the unidirectional voltage applied to the coils 29 and 30 is therefore dependent upon the temperature of the space 10.

-30

An anode 31 is provided to receive the electron beam, and is in a plane perpendicular to the axis Z. This anode 31 is composed of a uniform resistive material, for example carbon, and has a conductor 32 connected to one edge thereof and a conductor 33 connected to an opposite edge. The anode 31 is shown with a rectangular coordinate system superimposed upon the anode surface. This coordinate system has the axes X and Y and is placed in Figure 1 to more clearly point out the physical relationship of the cathode ray tube components. The intersection of the axis X with the axis Y is also the point of impingement of the axis Z with the anode 31. The axis X is parallel to the electrostatic lines of force produced when the plates 24 and 25 are energized and the axis Y is parallel to the central axis A of the coils 29 and 30. The conductors 32 and 33 of the anode 31 are positioned so that they are parallel to the axis X and therefore also parallel to the electrostatic lines of force produced when a potential is applied to the plates 24 and 25. The conventional cathode ray tube power source 35 is shown and is the means by which the operating potential of the various elements of the cathode ray tube 12 are established.

Figure 2 is a fragmentary sectional view of the cathode ray tube 12 taken at the section 2—2, omitting the envelope and the elements of the electron gun 20. The coils 29 and 30 are shown in section with the upper coil 29 having the current flowing into the coil in the upper conductor on the right hand side of the coil and having the current flowing out of the coil in the lower conductor on the left hand side of the coil. Since the coils are to be connected to produce opposing magnetic fields, the lower coil 30 has the current flowing into the coil in the upper conductor on the left hand side of the coil and the current flowing out of the coil in the lower conductor on the right hand side of the coil. The magnetic field generated by this current is shown by means of lines 36 having arrows to indicate the north-to-south direction of the field external to the coils. The plates 24 and 25 are also shown and, as is well known, the electrostatic lines of force produced by these plates are perpendicular to the plates. The axis Z of the cathode ray tube is shown as a point and represents the position the electron beam assumes when there is no electrostatic or magnetic field present to affect its travel. This electron beam is encircled by a line 37 to indicate the magnetic field generated by this flowing beam of electrons and having an arrow to indicate the direction of the magnetic field, this direction being the direction that a north magnetic pole would move in this field. From Figure 2 it can be seen that when voltage is applied to the plates 24 and 25 an electrostatic field is produced which tends to move the beam parallel to the axis X, in a direction depending upon the instantaneous polarity of the plates 24 and 25. Since this voltage is an alternating voltage supplied by the transformer secondary 26, the electron beam oscillates betwen the plates 24 and 25, the amplitude of such oscillation being dependent upon the magnitude of the voltage present on the plates 24 and 25.

If a unidirectional voltage is now applied to the series circuit which includes the coil windings 29 and 30, and if this unidirectional voltage is of a proper polarity, the magnetic field as indicated in Figure 2 is generated. The field is centered about the axis Z and because the fields produced by coils 29 and 30 are opposing fields, the magnetic field at the axis Z is zero. However, as shown by the lines 36, as the electron beam moves along the X axis to either side of the Y axis it is acted upon by a resultant magnetic field which has a component in a direction toward the axis Z. The effect upon the electron beam therefore is to deflect the electron beam from its normal oscillatory motion along the X axis. With the conditions as existing in Figure 2, this deflection when the electron beam is to the left of the Y axis is perpendicular to the X axis and in a direction to deflect the electron beam above the X axis, as shown by the dotted line 40 of Figure 2. When the electron beam moves to the right of the Y axis it is acted upon by a force perpendicular to the X axis, so that the electron beam is moved below the X axis as shown by the dotted line 40. It is of course understood that if the unidirectional voltage applied to the series circuit containing the windings 29 and 30 is of a reverse polarity from that necessary to set up the conditions of Figure 2, the electron beam is deflected into the third and first quadrants of the coordinate system formed by the X and Y axes instead of into the second and fourth quadrants as shown in Figure 2. As stated before, the polarity of the voltage applied to the coils 29 and 30 depends upon whether the temperature of the confined space 10 is above or is below the desired value.

The conductors 32 and 33 of the anode 31 are connected to a center tapped primary 44 of a transformer 45. The secondary 46 of the transformer 45 is connected to the input of the phase sensitive amplifier 13. The amplifier 13 is connected to a source of power consisting of a secondary 47 of the transformer 27. The output of the amplifier 13 is connected to one of the field windings 48 of the two phase reversible motor 14. The other field winding 49 of the two phase motor 14 is connected to the secondary 50 of the transformer 27 and receives its energization therefrom. The motor 14 is coupled to a gear train 51 and by means of the gear train controls the valve 15 located in the fuel conduit 16. The transformer 27 includes a primary 52 which is energized from a source of alternating current power, not shown, by closing of a switch 53.

It is a function of the modulator of this invention to produce an alternating current signal at the input of the amplifier 13 and thereby affect adjustment of the valve 15 when the electron beam impinges upon the anode 31 in a pattern such as shown by line 40 of Figures 2 and 3.

It will first be assumed that the plates 24 and 25 are energized by secondary 26 and that the electron beam impinges upon the anode 31 along the axis X. At any given instant the electron beam is impinging on the anode 31 at a given point along the axis X. These electrons have two paths available to complete a return circuit to the cathode 18. The first path can be traced from the given point in axis X across the surface of anode 31 to conductor 33, a conductor 63, the left hand portion of primary 44, a ground connection 61, a ground connection 62, and power source 35 to cathode 18. The second path can be traced from the given point in axis X across the surface of anode 31 to conductor 32, a conductor 60, the right hand portion of primary 44, ground connection 61, ground connection 62, and power source 35 to cathode 18. It can therefore be seen that the current making up the electron beam divides itself between the two above mentioned paths in accordance with the resistance of the surface of anode 31 to the flow of current in the particular path being considered.

However, since the electron beam is impinging on the anode along the axis X and since the axis X is parallel to the conductors 32 and 33 and since the anode 31 is composed of a uniform resistive material, the resistance which the anode surface presents to flow of electron current in either of the above paths is a constant value for each and every point along the axis X. Therefore the electron currents flowing in the two portions of the primary 44 are of a constant magnitude. The resultant effect upon the secondary 46 of transformer 45 is that of passing a unidirectional current of constant magnitude thru the primary 44, therefore, no voltage is induced in the secondary 46.

Let it now be assumed that the coils 29 and 30 have applied thereto a unidirectional voltage. The electron beam now impinges upon the anode 31 along a line of intersection such as is shown by line 40. The resistance to electron current flow which the surface of anode 31 presents in each of the above mentioned paths to the electrons of the electron beam now has a different value for each point on the line of interception of the beam by the anode 31.

As explained above, the current flowing in each of the above mentioned paths and therefore the current flowing in each portion of the primary 44 varies as the resistance of the anode surface in the particular path being considered. The net effect upon the transformer 45 is that of applying a continuously varying current to the primary 44. The secondary 46 then has an alternating current voltage induced in it and a signal is applied to the phase sensitive amplifier 13. The two phase reversible motor 14 is therefore energized to adjust the valve 15 in a direction depending upon the phase of the voltage induced in secondary 46.

To more fully disclose the manner in which the modulator of Figure 1 is phase sensitive, it will be assumed that the electron beam is impinging on the anode 31 along a line of interception as shown by line 40 of Figure 3. It will further be assumed that the beam in its sweep across the anode 31 has left the intersection of the coordinate axes X and Y and is moving into the second quadrant. At this instant the electron current flowing to conductor 32 is increasing while the electron current flowing to conductor 33 is decreasing. The effective current flowing in the primary 44 is therefore a current flowing from right to left and increasing in magnitude. As the beam swings down into the fourth quadrant this effective current in primary 44 is reversed and a complete cycle of the beam over the line 40 results in a cycle of alternating current of a given phase being induced in secondary 46. The amplifier 13 therefore energizes the field winding 48 with alternating current of a first phase to cause the motor 14 to rotate in a first direction.

It will now be assumed that the unidirectional voltage produced by thermocouple 28 reverses in polarity in response to a change in the temperature of the space 10. The electron beam now impinges on the anode 31 along a line of interception similar to line 40, however, this line of interception now traverses the first and third quadrants of the coordinate system X, Y. Considering the beam as it sweeps across the intersection of the coordinate axis X and Y moves now into the third quadrant, at this instant the electron current flowing to conductor 32 is decreasing while the electron current flowing to conductor 33 is increasing. It is immediately recognized that this is the reverse of the condition existing as pointed out above. The effective current now flowing in the primary 44 is a current flowing from left to right and increasing in magnitude. A complete cycle of the beam along the line results in a cycle of alternating current of opposite phase to that obtained above being induced in the secondary 46. The amplifier 13 therefore energizes the field winding 48 with alternating current of a second phase to cause the motor 14 to rotate in a second direction.

Referring to Figure 3, the coordinate system of Figures 1 and 2 is shown superimposed upon the anode 31, the anode being viewed from the side which intercepts the electron beam. The electron beam normally sweeps across the anode 31 along the X axis and when a magnetic field is produced by the coils 29 and 30 the travel of the electron beam is modified to sweep the anode in a manner such as indicated by the dotted line 40. The line 40 of Figure 3 is the trace of the electron beam on the anode 31 while the line 40 of Figure 2 is the trace of the same beam on the plane of the section 2—2.

The improved modulator of this invention is inherently free of errors normally introduced by stray magnetic fields which may be present in the vicinity of the cathode ray tube 12. To explain this important feature Figure 3 is provided.

To more clearly point out the fact that the invention does not respond to stray magnetic fields it will be assumed that a stray magnetic field is present about the cathode ray tube 12 and that this field has a direction as indicated by the arrow C of Figure 3, the arrow indicating the direction in which a north magnetic pole would move if placed in this field. Since the electron beam, as viewed in Figure 3, generates a magnetic field having a clockwise direction, the electron beam is acted upon by a force perpendicular to the arrow C and having a direction to the right of the arrow C. This force can be resolved into a first component directed along the axis X and to the right of axis Y and into a second component directed along the axis Y and above the axis X. The net effect is that the normal X and Y axis are translated to a position as indicated by the coordinate system X', Y'. Therefore, the electron beam now normally sweeps the anode along the axis X' and the beam, as modified by the magnetic field of coils 29 and 30, sweeps the anode in the same manner as shown by dotted line 40, however the line 40 is now centered about the intersection of axes X' and Y'.

It can therefore be seen that while a stray magnetic field causes the imaginary coordinate system X, Y to be translated, the resistance from any point in the line of interception of the electron beam by the anode 31 to either the conductor 32 or 33 is a constant value for all points in the line of interception and no alternating current voltage is induced in the secondary 46 so long as the coils 29 and 30 are not energized.

*Operation of Figure 1*

It will first be assumed that the temperature of the confined space 10 is of the desired value. Therefore there is no voltage applied to the series circuit containing the coils 29 and 30, and as explained before, the electron beam sweeps across the anode 31 along the axis X. This oscillation is caused by the reversing electrostatic field produced by the plates 24 and 25 which are connected to the secondary 26. In every position of the electron beam along the axis X the resistance of the path from the axis X to the conductor 32 and the resistance of the path from the axis X to the conductor 33 is a constant value. Therefore, the unidirectional current flowing in each portion of primary 44 is of a constant magnitude and no alternating current voltage is present at the input of the amplifier 13.

If the temperature of the confined space 10 changes from the desired value, a unidirectional voltage is produced by thermocouple 28 and applied to the series circuit containing the windings 29 and 30 and a magnetic field such as that shown in Figure 2 is generated by the windings. The electron beam now sweeps across the anode 31 in a manner as indicated by the dotted line 46. Therefore, as the electron beam sweeps across the anode 31, the resistance to electron current flow which the anode 31 presents in each of the above mentioned paths is a constantly changing quantity. The effective current now flowing in primary 44 of the transformer 45 is a constantly varying current and an alternating current voltage is induced in the secondary 46 of the transformer 45. The amplifier 13 amplifies this alternating current voltage and applies it to the field winding 48 of the two phase reversible motor 14 to thereby cause the motor 14 to drive the gear train 51 and adjust the valve 15 in the fuel conduit 16 to regulate the amount of fuel flowing to a burner not shown located in the confined space 10 and to thereby adjust the temperature of the confined space 10.

Figure 4 is a showing of a modification of the improved modulator wherein a cathode ray tube 110 is provided with a fluorescent screen 111. The cathode ray tube 110 includes a cathode 18 which emits electrons when heated by a filament 19. Also provided is an electron gun 112 having a control grid 113, a focusing electrode 114, and an accelerating electrode 115. The electrons being emitted by the cathode 18 are accelerated and focused into a narrow beam of electrons directed along the axis Z. It is to be noted that the electron gun 112 is tilted to shift the axis Z away from the central axis of the cathode ray tube 110.

To facilitate the explanation of the arrangement of the components of the cathode ray tube 110, the fluorescent screen 111 has superimposed thereon the coordinate system X, Y. The axis Z along which the electrons are accelerated intersects the fluorescent screen 111 and the axis Y at a point substantially above the X axis. Also provided within the cathode ray tube 110 are a pair of electrostatic deflection plates 24 and 25. These plates are positioned so that the electrostatic lines of force which are produced when the plates 24 and 25 are energized are parallel to the X axis. A second set of electrostatic deflection plates 116 and 117 are provided in space quadrature with the electrostatic deflection plates 24 and 25. The electrostatic lines of force produced by the plates 116 and 117 therefore are parallel to the axis Y of the ocordinate system. Magnetic deflection coils 29 and 30 are provided and are connected in a series circuit to produce opposing magnetic fields when energized by a circuit including thermocouple 28. It is to be noted that these coils 29 and 30 are centered about an axis A which is parallel to the axis X of the coordinate system. The physical position of the coils 29 and 30 with respect to the other components of the cathode ray tube 110 is shown more clearly in Figure 5, which figure will be explained later.

A conventional direct current power source 35 is provided to supply the operating potential for the elements of the cathode ray tube 110. A transformer 27 having a primary 52 connected to a source of alternating current, not shown, is provided to supply alternating current power to the modulator. The center tapped secondary 26 of the transformer 27 supplies alternating voltage to the deflection plates 24 and 25 of the cathode ray tube 110. The secondary 47 supplies power to a direct current amplifier 126. The secondary 50 supplies power to a field winding 49 of a two phase reversible motor 14.

A light sensitive device 125 is positioned to view the fluorescent screen 111 of the cathode ray tube 110. However, the light sensitive device 125 views only a portion of the fluorescent screen 111 since the lower portion of this screen is covered by an opaque mask 137. The upper edge of this opaque mask 137 coincides with the axis X of the coordinate system. The light sensitive device 125 is connected to the input terminals 141 and 142 of the direct current amplifier 126 and the output terminals 143 and 144 of the direct current amplifier are connected to the second set of electrostatic deflection plates 116 and 117. Also connected to the output terminals of the direct current amplifier 126 is a second field winding 48 of the motor 14, the winding 48 being connected to the direct current amplifier through the blocking capacitors 127 and 128.

*Operation of Figure 4*

Initially, the electron beam upon leaving the electron gun 112 enters the electrostatic field produced by the deflection plates 24 and 25 and, since an alternating current voltage is applied to these deflection plates from the center tapped secondary 26, the electron beam assumes an oscillatory motion in a direction parallel to the X axis. This electron beam impinges upon the fluorescent screen 111 considerably above the axis X. The light sensitive device 125 senses the light being emitted by the fluorescent screen 111 and supplies a signal to the input terminals 141 and 142 of the direct current amplifier 126 so that the amplifier produces a voltage at its output terminals 143 and 144 the polarity of which, as indicated on Figure 4, is such that a positive voltage is applied to deflection plate 117 and a negative voltage is applied to the deflection plate 116. Therefore, the electron beam is subjected to a force tending to move the beam toward the X axis. Since, as before stated, the electron beam is focused into a narrow beam, as the electron beam moves down to coincide with the X axis the quantity of light being emitted by the fluorescent screen 111 decreases since a portion of the electron beam lies behind the opaque mask 137. Therefore, an equilibrium position will be reached wherein the output voltage produced by the direct current amplifier is of sufficient magnitude to cause the center of electron beam to impinge upon the fluorescent screen 111 along the axis X of the coordinate system. This is the normal operating condition of the modulator.

It will now be assumed that a voltage is applied to the coils 29 and 30 in a manner as before stated in connection with Figure 1. Figure 5 is a fragmentary sectional view of the cathode ray tube 110 taken at the section 5—5, omitting the envelope and the elements of the electron gun 112. The coils 29 and 30 are shown in section with the direction of current flow in the respective coils being shown with the invention set forth in connection with Figure 2. It is evident from the magnetic field represented by the lines 136, neglecting plates 116 and 117, that the effect upon the electron beam as it oscillates along the axis X is the same as described above with reference to Figure 2. The electron beam is acted upon by the opposing magnetic fields of the coils 29 and 30, which produce a force having a component parallel to the Y axis and increasing in opposite directions on opposite sides of the Y—Z plane, to cause the elecctron beam to attempt to trace upon the fluorescent screen 111 a line having a constantly varying displacement from the axis X in the same manner as shown by dotted line 40 in Figure 2. However, as the electron beam begins to move above the X axis onto the unmasked portion of the fluorescent screen 111 or below the X axis and behind the opaque mask 137, the light sensitive device 125 responds to the increasing or decreasing amount of light which is received by the light sensitive device to apply a control signal to input terminals 141 and 142 of the direct current amplifier 126. The amplifier then operates to vary its unidirectional output voltage. If the beam begins to move above the X axis, the light sensitive device 125 will receive a greater amount of light and the direct current amplifier 126 operates to increase its output voltage and thereby apply a greater negative voltage to the deflection plate 116 while applying a greater positive voltage to the deflection plate 117, thereby causing the electron beam to again move down to coincide with the X axis. If the electron beam begins to move behind the opaque mask 137, this procedure is reversed, with the negative voltage on the deflection plate 116 and the positive voltage on the deflection plate 117 reducing in magnitude, to thereby cause the electron beam to move up to coincide with the X axis.

Therefore, it can be seen that the light sensitive device 125 transmits to the direct current amplifier 126 a cyclic control signal, and thereby causes the output voltage of the direct current amplifier to vary about its normal value in a cyclic manner at the frequency of the source of voltage applied to plates 24 and 25. Field winding 48 of the two phase motor 14 is connected to the output terminals 143 and 144 of the direct current amplifier 126 through the blocking capacitors 127 and 128. Therefore, the output voltage of the direct current amplifier 126 is ineffective to energize the winding 48 unless the output voltage of the amplifier has an alternating component since the blocking capacitors 127 and 128 will not transmit to the field winding 48 the direct current component of the output voltage of the direct current amplifier 126. As can be seen from the explanation above, the output voltage of the direct current amplifier 126 will have an alternating component when the windings 29 and 30 are energized by the thermocouple 28.

The modulator of Figure 4 is also free of errors normally introduced into the system by a stray magnetic field. It will be assumed that a stray magnetic field is present which tends to cause the electron beam to move above the X axis onto the unmasked portion of the fluorescent screen 111, in a manner as described in connection with Figure 3. The light sensitive device 125 senses this by receiving an increasing amount of light from the fluorescent screen 11. A constant signal is therefore fed to the input terminals 141 and 142 of the direct current amplifier 126 which causes the output voltage of the amplifier to increase in magnitude, that is, negative voltage applied to the deflection plate 116 and the positive voltage applied to the deflection plate 117 increases in magnitude, to thereby cause the electron beam to move down to coincide with the X axis. It can therefore be seen that a stray magnetic field is corrected for in the modulator of Figure 4 by the output voltage of the direct current amplifier 126 being adjusted to an average voltage different from its normal value, the sense of such adjustment depending upon the sense of the stray magnetic field.

Figure 6 is a representation of a further modification of the improved modulator wherein an anode 200, having two plates 201 and 202, is provided in a cathode ray tube 212. The cathode ray tube 212 includes a cathode 18 which emits electrons when heated by the filament 19. An electron gun 220 having a control grid 213, a focusing electrode 214 and an accelerating electrode 215 is provided to form the electrons being emitted from the cathode 18 into a relatively broad beam and to accelerate them along the axis Z. Superimposed upon the anode 200 is a coordinate system X, Y. The origin of the coordinate system is also the point of intersection of the axis Z with the coordinate system. The anode 200 is positioned so that the plates 201 and 202 face each other along space opposed parallel edges, the space between the plates coinciding with the X axis, and the plane of the plates is parallel to the plane of the coordinate system. A pair of electrostatic deflection plates 24 and 25 are provided and are mounted to produce movement of the electron beam in a direction parallel to the X axis when energized. A second set of electrostatic deflection plates 116 and 117 are provided to cause movement of the electron beam in a direction parallel to the Y axis when energized. A pair of series connected magnetic deflection coils 29 and 30 are provided to produce opposing magnetic fields traversed by the electron beam. The axis A about which the coils 29 and 30 are centered is parallel to the Y axis.

A conventional direct current power source 35, connected to ground at ground terminal 62, is provided to supply the operating potential for the elements of the cathode ray tube 212. The plates 201 and 202 of the anode 200 complete the return path for the electrons to the power source 35 by means of the resistors 210 and 211 which connect to the ground terminals 262 and 261 respectively.

A differential amplifier 250 has its input terminals 241 and 242 connected to the resistors 210 and 211 to thereby receive a voltage which is the difference of the voltages present across the resistors 210 and 211. This differential amplifier 250 provides a voltage at its output terminals 243 and 244 the polarity and magnitude of which are dependent upon the sense and magnitude of the difference in voltages developed across the resistors 210 and 211. An amplifier of this type which would be suitable for use in the modulator of Figure 6 is shown on page 442, Figure 11.25, Volume 18 of the Radiation Laboratory Series. The output voltage of the amplifier is fed to the deflection plates 116 and 117 and also, by means of the blocking capacitors 127 and 128, to the field winding 48 of a two phase reversible motor 14.

A transformer 27 having a primary 52 which is connected to a source of alternating current power, not shown, is provided to supply alternating current power to the modulator. A center tapped secondary 26 of the transformer 27 is connected to the electrostatic deflection plates 24 and 25 to thereby cause the electron beam to oscillate between the deflection plates 24 and 25 in a direction parallel to the X axis of the coordinate system. A secondary 47 of the transformer supplies power to the differential amplifier 250, while a secondary 50 of the transformer 27 energizes a field winding 49 of the motor 14.

*Operation of Figure 6*

It will first be assumed that no voltage is applied to the deflection plates 116 and 117, and also that the coils 29 and 30 are not energized. This condition exists when the output voltage of the differential amplifier 250 is zero and when the output voltage of the thermocouple 28 is zero. The electron beam upon leaving the electron gun 220 is acted upon by the electrostatic field generated by the deflection plates 24 and 25 which are connected to the transformer secondary 26 and the electron beam oscillates in a direction parallel to the X axis. When the beam impinges equally upon the plates 201 and 202 of anode 200 to form equal anode currents flowing to the resistors 210 and 211 the voltage applied to the input terminals 241 and 242 of the differential amplifier 250 is zero since the difference between the voltages developed across the resistors 210 and 211 is zero. However, if the trace of the electron beam does not coincide with the axis X, for example if it impinges upon the plate 201 of the anode 200 to a greater extent than upon the plate 202, a greater voltage will be developed across the resistor 210 than across the resistor 211 and the differential amplifier, sensing this difference in voltage, produces an output voltage which, for the example stated, energizes the deflection plates 116 and 117 so that the plate 116 has applied thereto a negative voltage while the plate 117 has applied thereto a positive voltage. The electron beam is thereby caused to move down into a position which again coincides with the X axis so that the anode currents of plates 201 and 202 are again of equal magnitude.

It will now be assumed that the coils 29 and 30 are energized by thermocouple 28, in a manner previously explained. The electron beam now tends to trace upon the anode 200 a line similar to that shown by the dotted line 240, the line 240 indicating the center of the broad trace which the beam tends to make. However, as the electron beam tends to move above the X axis to impinge to a greater extent upon the plate 201 of the anode 200 the differential amplifier 250 applies to the deflection plates 116 and 117 a voltage which brings the electron beam down to again coincide with the X axis. This procedure is repeated as the electron beam tends to move below the X axis to impinge to a greater extent upon the plate 202 of the anode 200, however, the output voltage of the differential amplifier in this instance is of a reverse polarity to thereby cause the beam to move up to again coincide with the X axis. It can therefore be seen that the output of the differential amplifier is a cyclic voltage which is of one polarity as the electron beam is on one side of the Y axis and is of a reverse polarity as the electron beam is on the opposite side of the Y axis. The blocking capacitors 227 and 228 allow this cyclic output voltage of the differential amplifier to be applied to the winding 48 of the motor 14 to thereby cause the motor 14 to rotate in a direction depending upon the phase of the output voltage of the differential amplifier 250. As has been previously explained, the quadrants of the coordinate system into which the electron beam tends to move, and thereby the phase of the output voltage of the differential amplifier 250, depends upon the polarity of the output voltage of the thermocouple 28.

The device of Figure 6 is also unaffected by a stray magnetic field since the stray magnetic field simply causes the electron beam to move away from the X axis as explained in connection with Figure 3. As the beam tends to move away from the X axis the voltage developed across the resistors 210 and 211 changes due to unequal anode currents and the differential amplifier 250 produces an output voltage at the output terminals 243 and 244 which is applied to the deflection plates 116 and 117 to cause the electron beam to again coincide with the X axis. This output voltage is a direct current voltage and therefore is not transmitted to the field winding 48 through the blocking capacitors 127 and 128, therefore motor 14 will not be energized.

While I have shown my improved cathode ray tube modulator as used with a condition control apparatus there are many obvious embodiments and modifications readily apparent to those skilled in the art and therefore I intend to be limited solely by the scope of the appended claims in which I claim:

1. Control apparatus comprising an electron discharge device having means directing a beam of electrons along an axis, anode means comprising a sheet of resistance material and a pair of parallel electrical conductors bounding said sheet at opposite edges thereof, means mounting said anode for impingement by said electron beam so that anode currents flow to said conductors, the magnitudes of said currents depending upon the resistance of said anode from the point of said impingement to said conductors, means producing oscillatory movement of said electron beam to trace upon said anode a line parallel to said conductors, means mounted between said first named means and said anode means producing opposing magnetic fields centered about said axis producing variable movement of said electron beam in a direction perpendicular to said line, and circuit means including said conductors, said circuit means producing a control signal in response to current in said conductors which is of a continuously varying magnitude.

2. Control apparatus comprising an electron discharge device having means forming and directing a beam of electrons along an axis, anode means comprising a sheet of resistance material having a plurality of aligned space opposed electrical conductors, means mounting said anode for impingement by said beam, means producing oscillatory motion of said beam to trace upon said anode a line aligned with said conductors, means mounted between said first named means and said anode means producing opposing magnetic fields centered about said axis for producing cyclic movment of said beam in a direction lateral to said line, and circuit means including said conductors, said circuit means producing a control signal in response to the movement of said beam lateral to said line.

3. In combination an electron discharge device having means to produce and direct a beam of electrons along a first axis, anode means mounted for impingement by said beam, means producing oscillatory motion of said beam to trace a line upon said anode, means mounted between said first named means and said anode producing opposing magnetic fields traversed by said beam, said magnetic fields when considered along a second axis intersecting said first axis and parallel to said line being zero at said first axis and increasing in opposite senses on opposite sides of said first axis, said magnetic fields thereby imparting to said beam a varying component of motion lateral to said oscillatory motion, and circuit means including said anode responding to said varying component of motion lateral to said line.

4. In combination an electron discharge device having means forming and directing a beam of electrons along a first axis, anode means mounted for impingement by said beam, means producing oscillatory motion of said beam to trace a line upon said anode, means mounted between said first named means and said anode producing opposing magnetic fields centered about said first axis; said magnetic fields, when considered along a second axis intersecting said first axis and parallel to said line, being zero at said first axis and increasing in opposite senses on opposite sides of said first axis; said magnetic fields thereby imparting to said beam a component of motion lateral to said oscillatory motion, said component of motion being in one direction on one side of said first axis and in the opposite direction on the other side of said first axis, and circuit means including said anode responsive to motion of said beam wherein the magnitude of said lateral component of motion is a continuously changing quantity.

5. Control apparatus comprising an electron discharge device having means producing and directing a beam of electrons along an axis, target means mounted for impingement by said beam, means producing oscillatory motion of said beam to trace a line upon said target means, means producing a voltage in accordance with a condition, a pair of coils energized by said voltage, means mounting said coils between said first named means and said target to produce opposing magnetic fields in an area including said beam moving in said oscillatory motion; said magnetic fields, when considered along a line of reference intersecting said axis and parallel to said trace line, being zero at said axis and increasing in opposite senses on opposite sides of said axis; said magnetic fields thereby subjecting said beam to a variable force with a component lateral to said oscillatory motion, said component of force being in one direction on one side of said axis and in the opposite direction on the other side of said axis, and circuit means responsive to motion of said beam caused by said component of force, said circuit means producing a control signal indicative of said condition.

6. Control apparatus comprising an electron discharge device having means forming and directing a beam of electrons along a first axis, anode means comprising a sheet of resistance material having a pair of parallel electrical conductors bounding opposite edges thereof, means mounting said anode for impingement by said electron beam, means producing oscillatory movement of said electron beam to trace upon said anode a line parallel to said conductors, the magnitudes of the currents to said conductors depending upon the resistance of said anode from said electron beam impingement to said conductors; means producing a voltage in accordance with a condition, electromagnetic means comprising a pair of coils energized by said voltage and arranged reversely to produce opposing magnetic fields traversed by said electron beam, said opposing magnetic fields producing a resultant field which when considered along a second axis intersecting said first axis and parallel to said line is zero at said first axis and increases in opposite senses on opposite sides of said first axis, said electron beam thereby assuming a variable component of motion lateral to said oscillatory motion, said component of motion being in one direction on one side of said first axis and being in the opposite direction on the other side of said first axis; condition changing means, and control circuit means including said conductors, said control circuit means controlling said condition changing means.

7. Control apparatus comprising an electron discharge device having means forming and directing a beam of electrons along an axis, means producing oscillatory motion of said electron beam to trace a line in a reference plane normal to said axis, a plurality of coils, means energizing said coils to produce opposing fluxes in an area between said coils in an area traversed by said beam to produce displacement of said electron beam in a direction perpendicular to said line, said displacement of said electron beam being in one direction from said line on one side of said axis and being in the opposite direction from said line on the other side of said axis, means responsive to continuous variation of said displacement to produce a control signal with an alternating current component, means responsive to said control signal, and means for applying said alternating current component of said signal to said responsive means, said last named means including means for preventing the application to said responsive means of any direct current component of said signal.

8. Control apparatus comprising an electron discharge device having means forming and directing a beam of electrons along a first axis, means producing oscillatory movement of said beam to trace a line in a reference plane normal to said first axis, means producing a voltage in accordance with a condition, a pair of coils energized by said voltage, means mounting said coils symmetrically about said first axis in a manner producing opposing magnetic fields which, when considered along a second axis intersecting said first axis and parallel to said line, are of opposite senses on opposite sides of said first axis, thereby subjecting said beam to a displacement having a component which is lateral to said line and is in one direction on one side of said first axis and is in an opposite direction on the other side of said first axis; and means responsive to said component to produce a control signal which is indicative of said condition.

9. Control apparatus comprising an electron discharge device having means forming and directing a beam of electrons along a first axis, means producing oscillatory movement of said beam to trace a line upon a reference plane normal to said first axis, means producing a voltage in accordance with a condition, a pair of coils energized by said voltage, means mounting said coils symmetrically about said first axis in a manner producing opposing magnetic fields which, when considered along a second axis intersecting said first axis and parallel to said line are, zero at said first axis and increase in opposite senses on opposite sides of said first axis thereby causing cyclic movement of said beam having a variable component which is lateral to said line and is in one direction on one side of said first axis and is in an opposite direction on the other side of said first axis; and means responsive to said component to produce a control signal which is indicative of said condition.

10. Control apparatus comprising an electron discharge device having means directing a beam of electrons along a first axis, anode means comprising a sheet of resistance material and a pair of aligned electrical conductors bounding said sheet at opposite edges thereof, means mounting said anode for impingement by said beam to establish anode currents flowing from the point of impingement to said conductors, the magnitudes of said currents depending upon the resistance of said anode from said point of impingement to said conductors; means producing oscillatory movement of said beam to trace upon said anode a reference line which is aligned with said conductors to thereby cause said anode currents to have a constant differential, condition sensing means producing a voltage in accordance with a deviation of a condition from a normal value, the polarity of said voltage depending upon the sense of said deviation from said normal value, a pair of coils connected in a series circuit energized by said voltage, means reversely mounting said coils centered about said first axis to produce opposing magnetic fields; said opposing magnetic fields producing a resultant magnetic field which, when considered along a second axis intersecting said first axis and parallel to said reference line, is zero at said first axis and increases in magnitude, in opposite senses, with distance from said first axis on opposite sides thereof; said fields reversing with reversal of the polarity of said voltage, thereby imparting to the motion of said beam a component to cause said beam to trace upon said anode a different line having a positive or negative slope with respect to said reference line depending upon the polarity of said voltage, to thereby cause said anode currents to have a constantly varying differential, the sense of said differential depending upon whether the slope of said different line is positive or negative; an electrical device having a pair of current paths, circuit means connecting said conductors to said electrical device to thereby cause said anode currents to traverse said paths, said electrical device producing an alternating control signal when said anode currents have a continuously varying differential, the phase of said control signal depending upon the sense of said constantly varying differential.

11. In combination, an electron discharge device having means to form and direct a beam of electrons along an axis, anode means mounted to receive said beam, said anode having a pair of parallel conductors bounding the opposite edges thereof, means electrostatically producing an oscillatory movement of said beam to trace upon said anode a trace line parallel to said conductors, means magnetically producing opposing flux lines centered about said axis and acting upon said beam in a lateral direction to said trace line to modify the movement of said beam, the strength of said flux lines being zero at said axis and increasing in opposite senses for increasing distance on opposite sides of said axis, and means including said conductors unresponsive to the movement of said beam parallel to said trace line and responsive to movement of said beam at a continuously varying lateral distance from said trace line.

12. Control apparatus comprising an electron discharge device having means forming and directing a beam of electrons along an axis, anode means comprising a sheet of resistance material having a pair of aligned conductors at opposite edges thereof, means mounting said anode for impingement by said beam; means producing a first oscillatory motion of said beam to trace upon said anode a line aligned with said conductors, magnetic means having reverse connected coils to produce opposing magnetic fields centered about said axis for producing lateral to said line a second oscillatory motion of said beam, condition sensing means controlling one of said first or second means producing oscillatory motion of said beam, and means including said conductors producing a control signal in response to the change in movement of said beam caused by said one of said first or second means producing oscillatory motion of said beam.

13. Control apparatus comprising an electron discharge device having means directing a beam of electrons along an axis, target means comprising a fluorescent screen, means mounting said target for impingement by said beam, a light sensitive device mounted to view said fluorescent screen, an opaque mask mounted to shield a portion of said fluorescent screen from said light sensitive device, means producing oscillatory movement of said beam to trace a line upon said screen, means producing a voltage in accordance with a condition, a pair of coils energized by said voltage, means mounting said coils symmetrically about said first axis; said coils producing a resultant magnetic field, which when considered along a second axis intersecting said first axis and parallel to said line, is of opposite senses on opposite sides of said first axis; thereby subjecting said oscillating beam to a cyclic force having a component which is lateral to said line and is one direction on one side of said first axis and is in the other direction on the other side of said first axis, circuit means including said light sensitive device producing a control voltage when said light sensitive device views a quantity of light differing from that normally viewed when said electron beam impinges upon said fluorescent screen along the edge of said mask, means for electrostatically producing movement of said beam lateral to said line, and circuit means connecting said voltage to said means electrostatically producing movement of said beam lateral to said line, to thereby cause said beam to remain positioned along said edge of said mask.

14. Control apparatus comprising an electron discharge device having means forming and directing a beam of electrons along a first axis, target means comprising a fluorescent screen, means mounting said target means for impingement by said beam, means producing oscillatory motion of said beam to trace a line upon said screen, a light sensitive device mounted to view a portion of said fluorescent screen; said light sensitive device receiving light from said fluorescent screen, the normal quantity of said light being that which is emitted from said fluorescent screen as said electron beam impinges upon said screen along the boundary between said portion of said fluorescent screen which said light sensitive cell views and the portion of said fluorescent screen which said light sensitive device does not view; a pair of coils centered about said first axis producing opposing magnetic fields traversed by said electronic beam moving in said oscillatory motion; said opposing magnetic fields producing a resultant field which, when considered along a second axis intersecting said first axis and parallel to said line, is zero at said first axis and increases in opposite senses on opposite sides of said first axis; said electron beam thereby being subjected to a variable cyclic force having a component in a direction lateral to said line, said component being in one direction on one side of said first axis and being in the opposite direction on the other side of said first axis; control circuit means, including said light sensitive device, producing a control voltage in response to said light sensitive device receiving a quantity of light which is different from said normal quantity of light; the relative polarity of said voltage depending upon the sense of the variation of said quantity of light from said normal quantity, means for electrostatically producing movement of said beam lateral to said lines; and circuit means connecting said control circuit means to said last named means to thereby cause said beam to remain positioned along said boundary.

15. Control apparatus comprising an electron discharge device having means directing a beam of electrons along an axis, anode means comprising a pair of plates, means mounting said anode means for impingement by said beam, means producing oscillatory movement of said beam so that said beam normally impinges equally upon said anode plates to comprise equal anode currents, a pair of coils centered about said axis producing opposing magnetic fields traversed by said oscillating electron beam; said opposing magnetic fields producing a resultant magnetic field which, when considered along a second axis intersecting said first axis and parallel to said line of impingement, is zero at said first axis and increases in opposite senses for increasing distance on opposite sides of said first axis, to thereby subject said electron beam to a varying cyclic force having a component lateral to said line of impingement; said force being in one direction on one side of said first axis and being in the opposite direction on the other side of said first axis, thereby causing said electron beam to assume a motion having a cyclic component about said line of impingement to cause said anode currents to vary in a cyclic manner in opposite senses, control circuit means including said pair of plates, said control circuit means producing a control signal the magnitude and polarity of which is dependent upon the magnitude and sense of the differential of said anode currents, means for electrostatically producing movement of said beam lateral to said line of impingement, and circuit means connecting said control circuit means to said last named means to thereby cause said beam to impinge equally upon said anode plates.

16. Control apparatus comprising an electron discharge device having means directing a beam of electrons along an axis, target means comprising a fluorescent screen, means mounting said target for impingement by said beam, a light sensitive device positioned to view said fluorescent screen, means comprising an opaque mask mounted to shield an area of said fluorescent screen from said light sensitive device, an edge of said mask forming a boundary between the area of said fluorescent screen which can be viewed by said light sensitive device and the area of said fluorescent screen which cannot be viewed by said light sensitive device; means producing oscillatory movement of said beam parallel to said edge of said mask, the normal position of said beam being coincident with said edge so that said light sensitive device views a normal quantity of light which is produced by only a portion of said electron beam impinging upon said area of said fluorescent screen viewed by said light sensitive device; control circuit means, including said light sensitive device, producing a voltage of a first sense when said light sensitive device views a quantity of light greater than said normal quantity and producing a voltage of an opposite sense when said light sensitive device views a quantity of light less than said normal quantity; means for electrostatically producing movement of said beam lateral to said edge of said mask; circuit means connecting said control circuit means to said last named means to thereby cause said beam, moving in said oscillatory motion, to remain positioned in said normal position coincident with said edge of said mask; means producing a voltage dependent upon a condition; means, energized by said voltage, producing opposing magnetic fields traversed by said beam, said opposing magnetic fields producing a resultant magnetic field which is zero at the center of said oscillatory motion and increases in opposite senses with increasing distance on opposite sides of said center of oscillatory motion, to thereby subject said electron beam to a force having a component lateral to said edge of said mask, said component being in opposite direction on opposite sides of said center of oscillatory motion; said control circuit means thereby producing a voltage whose sense varies in a cyclic manner to thereby cause said beam, moving in said oscillatory motion, to remain in said normal position coincident with said edge of said mask; condition changing means responsive to a voltage whose sense varies in a cyclic manner, and means connecting said condition changing means to said control circuit means.

17. Control apparatus comprising an electron discharge device having means directing a relatively broad beam of electrons along an axis; anode means comprising a first and a second plate, said plates mounted in space opposed relation and facing each other along parallel edges thereof; means mounting said anode means for impingement by said electron beam; means producing oscillatory motion of said beam so that electron beam impinges equally upon said plates to thereby form equal anode currents; a first impedance element in series with said first plate, a second impedance element in series with said second plate, means connecting said first and second impedance elements in a series circuit so that the polarity of the voltage effective across said series connected impedance elements is indicative of the sense of the differential of said anode current; control circuit means, including said series connected impedances, producing a control voltage whose polarity is indicative of the sense of the differential of said anode currents; means producing opposing magnetic fields traversed by said electron beam; said opposing magnetic fields, when considered along said oscillatory motion, being zero at the center of said oscillatory motion and increasing in opposite senses with increasing distance on opposite sides of said center of oscillatory motion, thereby subjecting said electron beam to a variable cyclic force, said force being lateral to said oscillatory motion and being in one direction on one side of said center of oscillatory motion and being in the opposite direction on the other side of said center of oscillatory motion, to thereby cause said electron beam to assume a cyclic component of motion lateral to said oscillatory motion; the polarity of said control voltage produced by said control circuit means thereby varying in a cyclic manner; means for electrostatically producing movement of said beam lateral to said oscillatory motion, and means connecting said control voltage to said last named means to thereby substantially prevent said electron beam from assuming a cyclic component of motion lateral to said oscillatory motion.

References Cited in the file of this patent

UNITED STATES PATENTS

| Number | Name | Date |
|---|---|---|
| 1,870,888 | Berthold | Aug. 9, 1932 |
| 2,332,881 | Woerner | Oct. 26, 1943 |
| 2,372,210 | Labin | Mar. 27, 1945 |
| 2,374,666 | Cunniff | May 1, 1945 |
| 2,489,251 | Anast | Nov. 29, 1949 |
| 2,507,590 | Clark | May 16, 1950 |
| 2,530,775 | Kliever | Nov. 21, 1950 |
| 2,561,586 | Montgomery | July 24, 1951 |
| 2,588,292 | Rittner et al. | Mar. 4, 1952 |